UNITED STATES PATENT OFFICE.

ARTHUR CH. HESSELMEYER, OF CHICAGO, ILLINOIS.

PURE-KIESELGUHR BRICK AND PROCESS FOR MAKING THE SAME.

1,143,826.   Specification of Letters Patent.   Patented June 22, 1915.

No Drawing.   Application filed November 6, 1914. Serial No. 370,573.

*To all whom it may concern:*

Be it known that I, ARTHUR CH. HESSELMEYER, a citizen of the United States, residing at Chicago, in the county of Cook and State of Illinois, have invented a certain new and useful Pure-Kieselguhr Brick and Process for Making the Same, of which the following is a full, clear, concise, and exact description.

The subject matter of the present invention is a refractory and insulating material made of pure kieselguhr and a process for making the same.

Kieselguhr is recognized in the arts as one of the best possible heat insulating materials because of its multi-cellular character and because of its chemical composition being virtually pure amorphous silica. As is well known in the art, this material consists of the skeletons or cell-walls of minute organisms called diatoms.

Heretofore in forming kieselguhr into bricks for heat insulating and other purposes, it has been found impossible to bind the latter material together without the use of some binding substances. It has been common in the prior art to mix the kieselguhr with alkali or carbonaceous matters to form a bond between the particles of the substance. In the case of the lime or other alkali binders, the chemical composition of the kieselguhr would be changed so that the substance would become a sort of porcelain or glass, if it were burned to a high degree, although the burning is not carried to such a point as to completely fuse the block, it being customary to heat the bricks only to such a temperature as to frit together the particles, but this change in chemical composition destroys the value of kieselguhr as a heat insulating material because the porcelain or glass, which is formed by such a process, will melt at a lower temperature than pure silica which is the chief constituent of kieselguhr. Hence, fire-bricks made in this manner will not stand a high degree of heat both because the transmission of heat through them is greater and because the melting point of the substance has been lowered.

In the case of blocks or bricks of kieselguhr bound together by carbonaceous matters, it can readily be seen that a high heat may not be reached because of the carbonaceous matters which will burn out causing the brick to melt. In so far as the carbon becomes a constituent of the brick, the brick also loses in insulating properties owing to greater conductivity.

In manufacturing the brick of kieselguhr which is the subject matter of the present invention, I employ no binder whatsoever relying solely upon the cementitious properties of the material when properly treated as I shall describe later. Heretofore in the art this has been considered impossible because of the peculiar physical characteristics of the substance. I employ approximately one hundred parts of kieselguhr to about eighty parts of water by bulk, or its equivalent in weight. The kieselguhr is ground with the additional amount of water necessary for its proper bonding purposes. This step may require from 35 to 45 minutes according to the substance ground due to variations in porosity or density. It is very important that this grinding be not carried too far else it would completely destroy the cell structure and would defeat its chemical and physical possibilities.

The next step is to form the substance in a moist condition in suitable dies and immediately thereafter subject the same to hydraulic pressure. The brick remains under pressure for a certain time to cause it to set. It is necessary that the kieselguhr before it is pressed be not too wet otherwise it will not bond properly.

The bricks are next removed from the press and are placed in a kiln for burning. This step of burning dehydrates the material. It is important that the burning be not carried too far or the properties of the material will suffer. It is likewise necessary to watch the brick and to withdraw them from the kiln when they have been properly cured. The object of the burning seems to be mainly to drive out the water contained at the time of pressing. If the brick is burned further, the insulating quality suffers. However, it may be desirable to burn the bricks to various conditions in order to meet various requirements. The brick is a solid cohesive mass of pure kieselguhr with a specific gravity less than unity. The material is closely enough knitted together to emit a clear ringing sound when rapped with the knuckles. The block will not dissolve in water and may be heated when wet without danger of cracking.

While in the plastic condition the bricks may be shaped to any desired contour so as to meet various commercial requirements.

In a competitive test of fire brick, a brick of kieselguhr made according to my process (and which brick I have termed Si-Gur), some remarkable results were shown. Under a working condition of about 2550 degrees Fahrenheit in four hours and fifteen minutes, the best fire and insulating brick known heretofore, attained a temperature of 750 degrees, while the Si-Gur brick stood at only 300 degrees. At the end of six and one-half hours the other brick had all passed off the scale of the thermometer long ago and had dropped out of the test, while the Si-Gur brick reached a temperature of only 594 degrees showing also by its characteristic curve that it would not rise much higher. The insulating properties of the material are so vastly superior to any solid cohesive material now known in the art that this material finds ready application in a great variety of conditions such, for instance, as electrical furnace work in which the brick form the walls of the furnace and conserve the high degree of the heat which is generated in the interior of the furnace. The material is light enough to be highly useful in refrigerators and in refrigerating work.

This material may be readily cut and sawed as it has a chalky grain free of grit but is amply strong to stand transportation and rough usage although its tensile strength compared with most structural material is lower. It will stand a considerable load under compression and is therefore valuable as a brick or block.

The brick melts at substantially the melting point of pure silica which in fact kieselguhr is, that is—it will fuse under the carbid flame.

As the properties of kieselghur are well known in the art, it will suffice to say that the present invention is a pioneer in the art.

This invention renders the properties of pure kieselguhr available in solid, cohesive masses, suitable for general insulating and refractory purposes. However, I do not intend to limit the use of this product solely to heat or electrical insulation, but intend that the same shall be used in any situation in which the properties of pure kieselguhr would be found valuable and to any use which the material may hereafter be found capable of being put.

In this specification and in the following claims I employ the term pure kieselguhr to indicate kieselguhr to which no binder has been added. Others skilled in the art may consider it advisable to add inert material to the kieselguhr. I consider this as coming within the scope of my invention.

Having thus described my invention what I claim and desire to protect by Letters Patent of the United States, is the following:

1. The process of making kieselguhr into a solid brick or mass which consists in grinding the raw kieselguhr to bond, that is to the point just short of destroying the individual cell structures and thereafter forming the same in a suitable mold in moist condition, subjecting the same to sufficient pressure to bring the particles into intimate bonding relation and finally firing the brick or mass above dehydrating temperature but short of the sintering temperature to cure the same.

2. The process of making kieselguhr into a solid brick or mass which consists in grinding the raw kieselguhr under water to the degree of fineness short of destroying the individual cell walls whereby the material is brought to the bonding state, then forming the same in a suitable mold, then subjecting the same to pressure so as to bring the cells or particles into bonding relation then dehydrating the material by heating.

3. A molded article of kieselguhr composed of particles of pure kieselguhr ground to a fineness just short of destroying the cell walls, said particles being bonded together solely by the cementitious properties of the finely ground material.

4. A dense cohesive molded mass of pure homogeneous kieselguhr, said mass consisting of finely ground unsintered particles of kieselguhr bonded together by the cementitious properties of the finely ground material only.

In witness whereof, I hereunto subscribe my name this 4th day of November A. D. 1914.

ARTHUR CH. HESSELMEYER.

Witnesses:
 JOHN A. DIERRER,
 FREDERICK L. PIERCE.